United States Patent

Harrington et al.

[19]

[11] Patent Number: 6,111,734
[45] Date of Patent: *Aug. 29, 2000

[54] ELECTROSTATIC DISCHARGE PROTECTION CIRCUITS AND APPLICATION

[75] Inventors: Bradley M. Harrington, Carrollton; Thomas L. Polgreen, Dallas, both of Tex.

[73] Assignee: Dallas Semiconductor Corporation, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,258

[22] Filed: Mar. 6, 1997

Related U.S. Application Data

[60] Provisional application No. 60/012,992, Mar. 7, 1996.

[51] Int. Cl.[7] .................................................. H02H 9/00
[52] U.S. Cl. .......................................................... 361/56
[58] Field of Search ............................ 361/56, 91, 111, 361/54, 118, 91.1, 91.5, 91.6; 257/355

[56] References Cited

U.S. PATENT DOCUMENTS

| 4,984,031 | 1/1991 | Rinderle ..................................... 361/91 |
| 5,181,091 | 1/1993 | Harrington, III et al. ............... 257/355 |
| 5,510,947 | 4/1996 | Pellegrini et al. ......................... 361/56 |
| 5,600,525 | 2/1997 | Avery ......................................... 361/56 |

OTHER PUBLICATIONS

Dallas Semiconductor Data Sheet, DS9503; ESD Protection Diode with Resistors; Feb. 26, 1996; pp. 1–3.

*Primary Examiner*—Ronald W. Leja
*Attorney, Agent, or Firm*—Jenkens & Gilchrist, a Professional Corporation

[57] ABSTRACT

An electrostatic discharge (ESD) protection circuit including a first isolation structure on a first path, a second isolation structure on a second path, and a discharging element such as a Harrington diode structure connected to the first and second isolation structures. The isolation structures may comprise resistive elements. The ESD protection circuit is adaptable for use with microcircuits positioned in portable data carriers.

14 Claims, 2 Drawing Sheets

ELECTROSTATIC DISCHARGE PROTECTION CIRCUITS AND APPLICATION

PRIORITY UNDER 35 U.S.C. §119(e) & 37 C.F.R. §1.78(a)

This nonprovisional application claims priority based upon the following prior U.S. Provisional Patent Application entitled "Electrostatic Protection Device," Ser. No. 60/012,992 filed Mar. 7, 1996, in the names of Thomas L. Polgreen and Bradley M. Harrington.

BACKGROUND OF THE INVENTION

1. Technical Field of the Invention

The present invention relates to electrostatic discharge (ESD) protection devices for integrated circuits (ICs), and, in particular, to ESD protection circuits adaptable for a microcircuit positioned in a portable data carrier.

2. Description of Related Art

As ICs have increased in integration to include larger number of circuit elements, the geometry of the circuit elements has decreased in order to maintain the overall size of the IC relatively small. With decreasing geometries of the circuit elements, providing adequate levels of ESD protection has become increasingly difficult. In Metal Oxide Semiconductor (MOS) circuits the gate oxide thickness has decreased to below around 800–1000 nanometers (nm), and breakdown voltages are often less than 10 volts.

The basic principle of operation of an ESD protection device or circuit consists in limiting to an established maximum tolerable value, dictated by a particular fabrication process, voltage spikes which may occur on the pins of integrated structures which are connected to the respective pins. As can be appreciated by those skilled in the art, the highly integrated structures are often unable to withstand voltage spikes greater than certain amplitudes.

Various ESD protection circuits have been known for some time. For example, in U.S. Pat. No. 5,600,525, Avery discloses separate protection circuits for power supply pins and input/output pins. These circuits include a plurality of silicon controlled rectifiers (SCRs) electrically connected in series. In U.S. Pat. No. 5,510,947, Pellegrini et al. disclose an ESD protection structure employing a biasing element connected between two Zener diodes placed in opposition with each other. As can be appreciated, these and other known ESD protection structures involve relatively complicated circuitry.

The ESD-related problems may be particularly exacerbated in portable data carriers, electronic tokens and the like, having a microcircuit inside a housing formed from at least two conductive surfaces. Typically, these devices are interrogated by a read/write unit over a minimum of conductive paths such as, for example, an input/output path and a ground path. Some of these devices may tolerate an ESD stress at the 26 kV level (which corresponds to the International Electrotechnical Commission Standard IEC-801-2) without a hard failure. However, it has been known that in some applications these devices may suffer data disturb failures with an ESD stress below this level.

The present invention, described and claimed hereinbelow, provides a simple yet robust ESD solution for protecting the ICs without the above-mentioned deficiencies and shortcomings.

SUMMARY OF THE INVENTION

The present invention is directed to an ESD protection circuit for protecting an IC having an input/output (I/O) pin with an associated I/O path and a reference pin with an associated reference path. The ESD circuit comprises a first isolation structure connected to the I/O pin, the first isolation structure forming at least a part of the I/O path; a second isolation structure connected to the reference pin, the second isolation structure forming at least a part of the reference path; and at least one discharging element connected between the first isolation structure and the second isolation structure. In one embodiment, the first and second isolation structures comprise resistive elements.

The present invention also discloses an electronic system with an ESD circuit. The electronic system comprises a portable data carrier with a housing formed from portions of at least two conductive surfaces; a microcircuit positioned inside the portable data carrier, the microcircuit having an input/output pad and a ground pad; and an electrostatic discharge (ESD) protection circuit positioned inside the portable data carrier for protecting the microcircuit, the ESD protection circuit being disposed between the microcircuit and the portions of the two conductive surfaces.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
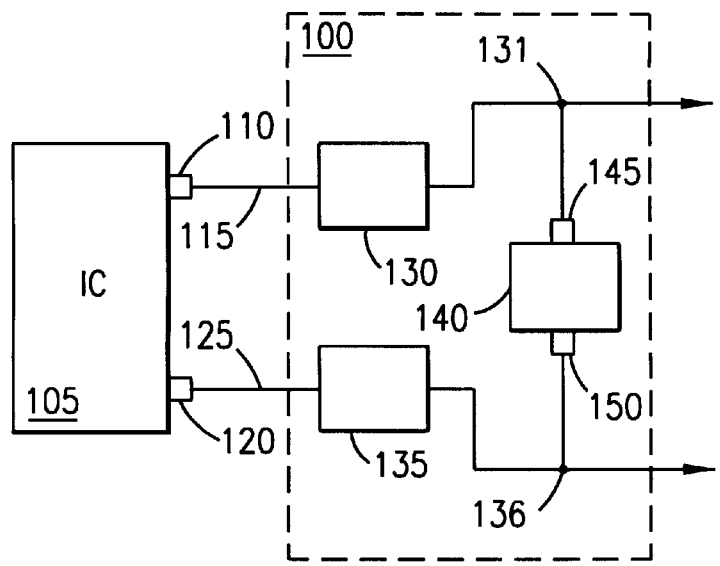
FIG. 1 depicts an ESD protection circuit in accordance with the teachings of the present invention.

Referring now to the Drawings wherein like or similar elements are designated with identical reference numerals throughout the several views, and wherein the various elements depicted are not necessarily drawn to scale, and more particularly to FIG.1, there is shown an ESD protection circuit 100 provided in accordance with the teachings of the present invention to protect an IC 105 against an ESD event.

The IC 105 comprises at least one input/output pin 110 and a reference pin 120. Connected to the input/output pin 110 is a first isolation structure 130 forming at least a part of an input/output path 115. A second isolation structure 135 is connected to the reference pin 120, which structure forms at least a part of a reference path 125. At least one discharging element 140 having a first terminal 145 and a second terminal 150 is connected between the first isolation structure 130 and the second isolation structure 135.

Continuing to refer to FIG. 1, a first common node, node 131, is formed between the first terminal 145 of the discharging element 140 and the first isolation structure 130 such that it is disposed on the input/output path 115. Similarly, a second common node, node 136, is formed between the second terminal 150 of the discharging element 140 and the second isolation structure 135 such that it is disposed on the reference path 125.

It can be appreciated that the ESD protection circuit 100 and the IC 105 may be formed integrally on one piece of semiconductor substrate. Alternatively, the ESD protection circuit 100 may be separately fabricated as a distinct electronic component with its own packaging such as, for example, a surface mount package (SMP).

Still continuing to refer to FIG. 1, the first and second isolation structures 130 and 135, in a presently preferred exemplary embodiment, may comprise resistive elements, each having a resistance of approximately 3 to 12 ohms. It should be appreciated that the isolation structures may in an alternative embodiment comprise inductive elements. The reference pin 120 may be grounded or a select voltage potential maybe applied thereto depending upon a particular application. The presently preferred embodiment of the discharging element 140 comprises a diode-like clamp element (hereinafter referred to as "Harrington" diode, described in U.S. Pat. No. 5,181,091 to Harrington, III et al., incorporated herein by reference) having an avalanche voltage around 8.0 to 10.0 volts. However, it should be appreciated by those skilled in the art that the discharging element 140 may also comprise known Zener diodes, SCRs and the like.

Figure 2:
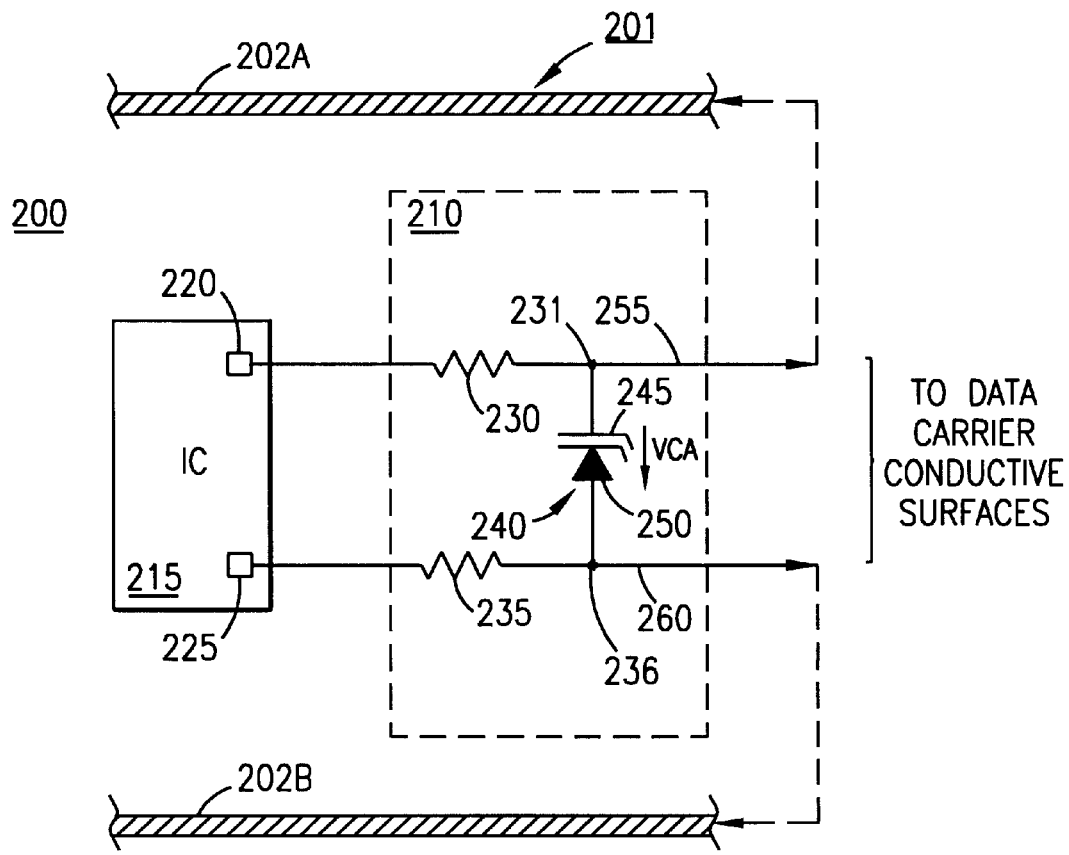
FIG. 2 depicts an exemplary embodiment of a system having an ESD protection circuit in accordance with the teachings of the present invention.

Referring now to FIG. 2, there is shown an exemplary electronic system, generally at 201, including a portable data carrier 200 (such as, for example, a Touch Memory™, Micro-In-A-Can™ or iButton™ product fabricated by Dallas Semiconductor Corporation, 4401 South Beltwood Parkway, Dallas, Tex. 75244) with a microcircuit 215 and a presently preferred embodiment of an ESD protection circuit 210 for protecting the microcircuit 215.

The microcircuit 215, which may include various electronic components such as one or more microcontrollers, processors, different types of memory and associated peripheral circuitry, oscillators and batteries, is positioned inside the portable data carrier 200. The microcircuit 215 comprises at least one input/output pad 220 and a reference pad 225 for facilitating information transmission to and from the microcircuit 215.

Continuing to refer to FIG. 2, the input/output pad 220 is connected to a first isolation element such as, for example, resistor 230. The reference pad 225 is connected to a second isolation element such as, for example, resistor 235. A Harrington diode 240 with anode 250 and cathode 245 is connected to each of the resistors 230 and 235. The anode 250 and the resistor 235 share a common node, node 236. Similarly, the cathode 245 and the resistor 230 share a common node 231. The common nodes 231 and 236 are connected via conductive traces 255 and 260, respectively, to "terminals" formed from portions of conductive surfaces 202A, 202B comprising a housing of the portable data carrier 200. As can be understood by those skilled in the art, the conductive surface portions can be used for communicating with external circuitry such as, for example, a read/write unit associated with a host or master (not shown).

Figure 3A:
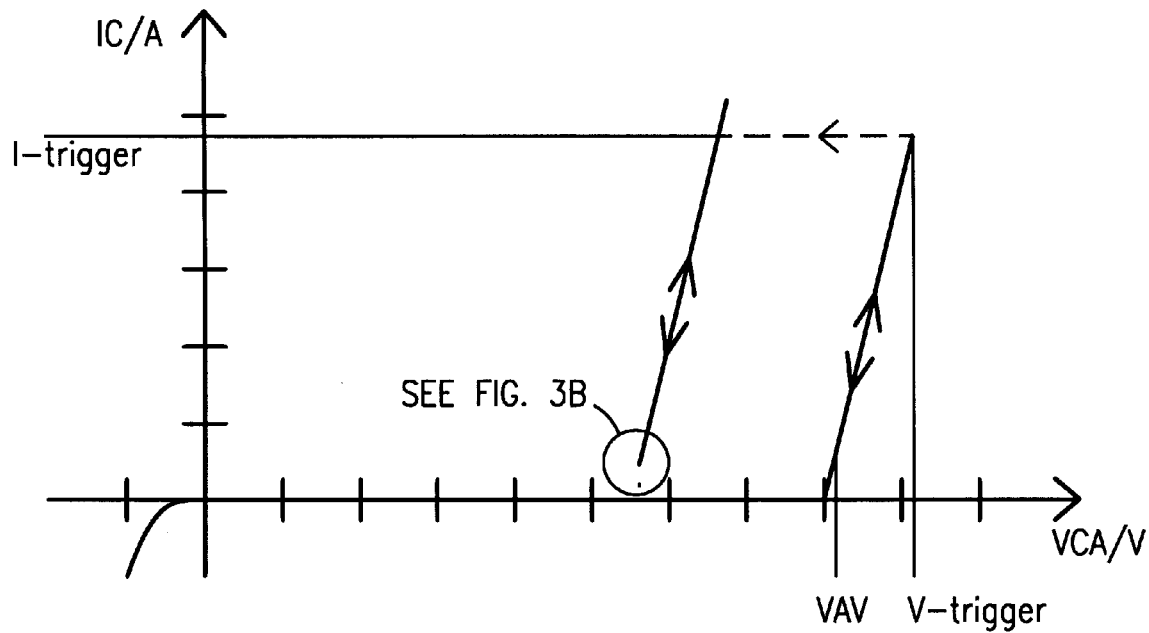
FIGS. 3A and 3B illustrate the I–V characteristics corresponding to an exemplary ESD protection circuit provided in accordance with the teachings of the present invention.
Figure 3B:
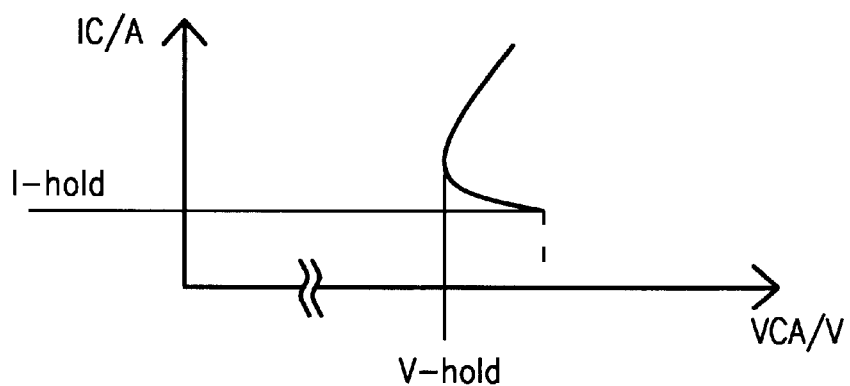

Referring now to FIGS. 3A and 3B, the DC I–V characteristics corresponding to an exemplary ESD protection circuit provided in accordance with the teachings of the present invention are shown. For the purpose of generating the I–V characteristics, the exemplary ESD circuit is provided with 5-ohm isolation resistors. Although the 5Ω resistance is negligible during data communication, it represents a high impedance relative to the conducting "diode" during an ESD event. Thus, the conducting "diode" absorbs the ESD energy while the resistors further isolate and protect an IC connected to the other side of the ESD protection circuit. It can be appreciated that if the ESD protection circuit according to the teachings of the present invention is used with ICs that already have an ESD circuit at their ports, the overall ESD protection level is raised to more than 27 kV (the IEC 801-2 reference model).

During normal operation, the exemplary ESD protection circuit behaves like a regular 7.5 V Zener diode. When the voltage exceeds the trigger voltage (labeled as V-TRIGGER in FIG. 3A), the I–V characteristic of the circuit will "snapback" (the snapback voltage being around 7.2 to 7.8 V), allowing the same or higher amount of current to flow at a significantly lower voltage. As long as a minimum current or voltage is maintained, the circuit will stay in the "snapback mode." If the voltage or the current falls below the holding voltage or holding current (labeled as V-HOLD and I-HOLD, respectively, in FIG. 3B), the circuit will abruptly change to its normal mode and conduct only small leakage current. Additional electrical characteristics of the presently preferred exemplary ESD protection circuit may be found in the Dallas Semiconductor DS 9503 Data Sheet entitled "ESD Protection Diode With Resistors", incorporated herein by reference.

Based upon the foregoing Detailed Description, those skilled in the art can appreciate that the present invention provides a simple yet robust ESD protection device that is adaptable at least for a microcircuit positioned in a portable data carrier. As can be understood, these portable data carriers may include data modules with ICs bonded to boards using the flip-chip technology, and substrates with microcircuits embedded therein or mounted thereon such as, for example, Smart Cards, transaction cards and the like. The exemplary ESD protection circuit provides a Zener-like characteristic coupled with voltage snapback to protect against ESD spikes. Further, the circuit is characterized with high avalanche voltage, low leakage and low capacitance to avoid signal attenuation.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An apparatus for protecting an integrated circuit from an electrostatic discharge, the integrated circuit having a first interface point and a second interface point, the apparatus comprising:

a first conductive path connected to the first interface point;

a second conductive path connected to the second interface point;

a discharging element connected to the first conductive path and the second conductive path;

a first isolation structure disposed in the first conductive path, the first isolation structure for substantially channeling the electrostatic discharge through the discharge discharging element; and a second isolation structure disposed in the second conductive path, the second isolation structure for substantially inhibiting the electrostatic discharge from reaching the second interface point;

wherein an electrostatic discharge received at the first conductive path is substantially directed to the discharging element by the first isolation structure and away from the first interface point of the integrated circuit, thereby protecting the integrated circuit from the electrostatic discharge.

2. The apparatus of claim 1 included with a portable data carrier.

3. The apparatus of claim 1, wherein the first isolation structure is an inductive element.

4. The apparatus of claim 1, wherein the discharging element is one of a Zener diode and a Harrington diode.

5. An electrostatic discharge protection circuit for protecting an integrated circuit having a first interface point and a second interface point, the circuit comprising:

a first conductive path connectable to the first interface point of the integrated circuit, the first conductive path including a first node for one of receiving and outputting signals;

a second conductive path connectable to the second interface point of the integrated circuit, the second conductive path including a second node for one of receiving and outputting signals;

a first isolation element connected intermediate the first interface point and the first node;

a second isolation element connected intermediate the second interface point and the second node; and a discharge element connected between the first conductive path and the second conductive path, the discharge element further connected intermediate the first isolation element and the first node, and the discharge element further connected intermediate the second isolation structure and the second node;

wherein an electrostatic discharge received at the first node is substantially directed to the discharge element by the first isolation structure and away from the first interface point of the integrated circuit, thereby protecting the integrated circuit from the electrostatic discharge.

6. The apparatus of claim 5, wherein the apparatus is included with a portable data carrier.

7. The apparatus of claim 5, wherein the first isolation structure is an inductive element.

8. A portable data carrier system comprising:

an integrated circuit having a first interface point and a second interface point;

a first conductive path connected to the first interface point;

a second conductive path connected to the second interface point;

a third conductive path connected to the first conductive path and the second conductive path;

a discharging element disposed in the third conductive path;

a first isolation structure disposed in the first conductive path, the first isolation structure for substantially channeling an electrostatic discharge through the discharge element in the third conductive path; and a second isolation structure disposed in the second conductive path, the second isolation structure for substantially inhibiting the electrostatic discharge from reaching the second interface point;

wherein an electrostatic discharge received at the first conductive path is substantially directed to the discharging element by the first isolation structure and away from the first interface point of the integrated circuit, thereby protecting the integrated circuit from the electrostatic discharge.

9. The portable data carrier of system 8, wherein the integrated circuit is a microcontroller.

10. The portable data carrier of system 9, wherein the microcontroller includes a memory device.

11. The system as recited in claim 8, wherein the integrated circuit and the discharging element are formed on separate semiconductor substrates.

12. The system as recited in claim 8, wherein said integrated circuit and the discharging element are formed on a single semiconductor substrate.

13. The system as recited in claim 8, wherein the discharging element comprises a clamp element.

14. The system as recited in claim 8, wherein the first isolation structure comprises at least an inductive element.

* * * * *

UNITED STATES PATENT AND TRADEMARK OFFICE
CERTIFICATE OF CORRECTION

PATENT NO. : 6,111,734  
DATED : August 29, 2000  
INVENTOR(S) : Harrington et al.

Page 1 of 1

It is certified that error appears in the above-identified patent and that said Letters Patent is hereby corrected as shown below:

<u>Column 4,</u>
Line 53, replace "through the discharge" with -- through the --

Signed and Sealed this

Thirteenth Day of November, 2001

*Attest:*

NICHOLAS P. GODICI
*Attesting Officer*     *Acting Director of the United States Patent and Trademark Office*